INVENTOR.
PATRICK W. BAKER

United States Patent Office 3,459,431
Patented Aug. 5, 1969

3,459,431
OIL SEAL-DUST SHIELD ASSEMBLY
Patrick W. Baker, 4118 Daner Drive,
Fort Wayne, Ind. 46805
Filed Mar. 13, 1967, Ser. No. 622,580
Int. Cl. F16j 15/48, 15/00; F02f 11/00
U.S. Cl. 277—57                                    5 Claims

ABSTRACT OF THE DISCLOSURE

An oil seal-dust shield assembly including an elastomeric element sealingly connected to a stationary housing and having a primary lip sealingly engaging a member rotatably disposed in the housing nad having an annular secondary lip projecting into an annular ring of C-shaped cross-section fitted on the rotatable member forming a labyrinth seal therewith which keeps dirt and dust away from a primary sealing lip.

---

This invention relates to an improved oil seal-dust shield assembly for use between a rotatable shaft and a non-rotatable sleeve which encircles and houses the rotatable shaft.

The subject seal is particularly adaptable for use between an axle housing and a shaft rotatably disposed relative thereto and extending therefrom; the seal being positioned at the location where the shaft projects from the housing and being adapted to prevent lubricant from escaping from the opening in the housing through which the shaft extends by sealingly engaging the housing and the shaft. With an oil seal assembly positioned in such a location, a situation of dust and dirt infiltration to the oil seal has always been a troublesome problem, and in the absence of protective exclusion means, dust and dirt particles will move into the area where the usual elastomeric sealing lip contacts the shaft member, and in so doing causes undue wear on the sealing lip and immediate shaft areas. This wear on the elastomeric sealing lip reduces its sealing ability, rendering the sealing assebmly inefficient as a unit.

Generally, shaft sealing assemblies have utilized additional constructional features in order to effect dirt exclusion. For example, various annular plate means of one type or another located adjacent to the main sealing body have been employed as dirt exclusion means. However, these devices as seen in the prior art are of limited success in their designed purposes. Consequently, the problem of external dirt interference with the sealing contact lip still exists to a certain extent in these prior art applications and further means are needed in this art in order to more fully protect the sealing element from external dirt intrusion.

Thus, it is an object of this invention to provide a shaft seal which has a longer operating life, and further that this object be accomplished by providing effective means for excluding external dirt and moisture from the critical oil sealing lip contact area so that this sealing lip is not subjected to accelerated wear.

Yet another object of this invention is to provide a shaft seal which is relatively simple to manufacture, but which will still be able to provide superior sealing protection.

Figure 1:
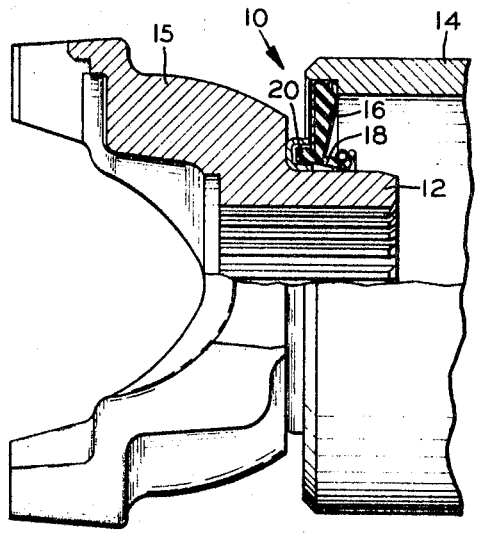
Figure 2:
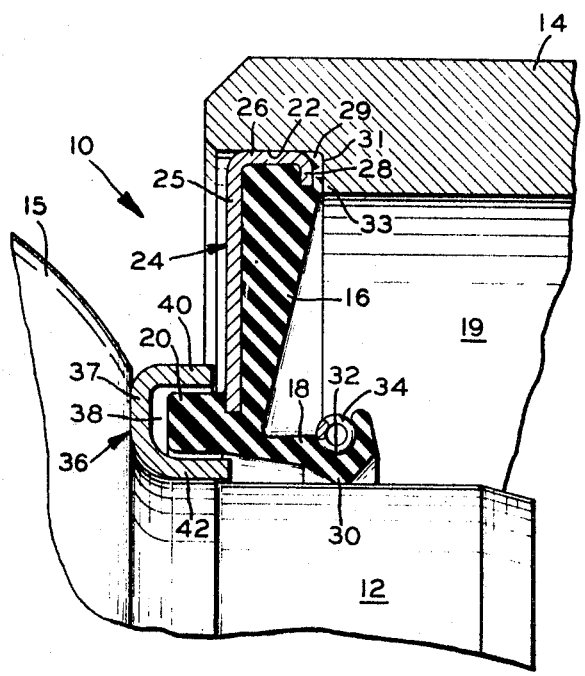

Other objects and purposes of this invention will become manifest from the following description taken in conjunction with the drawings, of which:

FIG. 1 is a view partially in section of a seal member in position between a rotatable shaft and a non-rotatable housing; and FIG. 2 is an enlarged cross-sectional view of a portion of the sealing assembly and adjacent shaft and housing seen in FIG. 1.

In a preferred embodiment of this invention an annular shaft sealing assembly is disposed between a rotatable shaft and a non-rotatable housing surrounding a portion of the shaft; the housing containing a lubricant and the shaft projecting out of the housing through an opening therein. The sealing assembly is comprised of an annular elastomeric body sealingly and stationarily connected to the housing and extending radially inwardly therefrom into a primary sealing contact with the outer periphery of the shaft and a ring of C-shaped cross-section which encircles and is secured to the shaft and which ring encloses a portion of the annular elastomeric body to form a labyrinth seal therewith and protect the primary seal from dust, dirt and water. An annular metallic plate is molded to the elastomeric body to stiffen the same and in conjunction with the C-shaped ring protects the elastomeric body from being physically damaged.

Referring to the drawings, an annular sealing assembly 10 is disposed between a rotatable shaft 12 and a non-rotatable sleeve 14, which sleeve surrounds the periphery of a portion of the shaft 12. The sleeve 14 is a part of a housing, such as an axle housing, which contains lubricant and the usual mechanical elements drivingly connected to the shaft 12. The portion of the housing to the right of the sleeve and the mechanical contents thereof have been omitted for clarity purposes. The left end of sleeve 14, as seen in FIG. 1, is spaced slightly to the right of a yoke extension 15 of the shaft 12. The annular sealing assembly 10 encircles the shaft 12 at a location just adjacent to the area of this shaft leading into the yoke extension 15.

The sealing assembly 10 has an annular elastomeric body 16 of inverted, generally T-shaped cross-sectional configuration, as seen in FIG. 2, which annular body extends from the peripheral surface of shaft 12 to the inner peripheral surface of outer sleeve 14 as it encircles shaft 12.

The annular elastomeric body 16 widens in cross-section towards its radially outer extremity, while at its radially inward extremity, it is bifurcated such that there are two annular projections which extend oppositely and parallel to the central axis of shaft 12. One of these projections is a primary sealing lip 18 which extends to the right, as seen in FIG. 1. This primary sealing lip 18 functions to sealingly contact the inner shaft member for preventing the movement of oil to the left of this lip from an oil holding space 19 defined between sleeve 14 and shaft 12. The other annular projection is a secondary sealing lip 20 which extends axially to the left, as seen in FIG. 1. The functional and structural relationships of the primary and secondary sealing lips 18 and 20 will be discussed more fully subsequently.

In order to provide the annular elastomeric body 16 with radial support, there is integrally bonded to the left side and the periphery of the elastomeric body, as seen in FIG. 2, an annular metallic backing case 24. The backing case 24 is L-shaped in cross-section, having a radially extending annular portion 25 and an annular rim 26 extending axially from the periphery of the portion 25. The annular rim 26 is oriented parallel to the central axis of shaft 12 and extends around and over a substantial portion of the outer radial periphery of the annular elastomeric body 16. The rightward surface of the portion 25 and the radially inner surface of the rim 26 are integrally bonded to the elastomeric body 16, and at the right axial extremity of the annular rim 26 is a small annular flange 28 which extends radially inwardly from the rim 26 and is embedded in the annular body 16. The outer peripheral surface of the rim 26 abuts against the inner surface of the counterbore 22 and the portion 29 of the periphery of annular elastomeric body 16 which is not covered by the rim 26 of the L-shaped backing case 24 abuts the portion of the surface of the counterbore 22 to the right of the rim 26, while the right face 31 of the elastomeric body 16 adjacent its periphery abuts against a shoulder 33 formed in the sleeve 14 at the right of the counterbore 22. Thus, by the engagement of the rim 26 and periphery 29 with the counterbore 22 and the engagement of the right face 31 and the shoulder 33, an oil tight non-rotatable seal is formed between the sealing assembly 10 and the sleeve 14 to prevent lubricant from flowing from the cavity 19 between the seal assembly and the sleeve.

On the radially inner surface of the primary oil sealing lip 18 is an annular radial extension 30 of V-shaped cross-sectional configuration, and the peak of this V-shaped extension makes an annular sealing contact with the surface of shaft 12. Since the annular elastomeric member 16 is non-rotatably secured to the sleeve 14, the shaft 12 rotates relative to the lip. In the radially outer surface of sealing lip 18 is an annular recess 32 in which is inserted an annular garter spring 34 which biases the sealing lip 18 radially inwardly so that the peak 30 is in a sealing contact with the shaft 12, the biasing effect of the spring and the fit between the peak 30 and the shaft 12 being such as to provide a suitable seal while not inhibiting rotation of the shaft relative to the sealing assembly 12.

The secondary sealing lip 20, which extends to the left as seen in FIG. 2, is suspended away from the surface of shaft 12. Immediately to the right of the yoke extension 15 of the shaft 12 is an annular ring 36 which encircles the shaft 12 and is securely fixed thereto as by being pressed thereon. The ring 36 may be made of metal or a fairly rigid plastic and has an annular vertical wall 37 on the left thereof, and a pair of radially spaced annular flanges 40 and 42 extending axially to the right from the wall 37, so that the ring is C-shaped in cross-section. The inner surface of the flange 42 is pressed on to the shaft 12 and an annular recess 38 bounded by the flanges 40 and 42 and the wall 37 opens toward the right, which recess receives the secondary sealing lip 20 to form a labyrinth seal therewith. The left end and the outer and inner peripheries of the lip 20 are closely spaced from the wall 37 and flanges 40 and 42 respectively. While a substantial space is shown in the drawings, it is preferred that the clearance between the secondary sealing lip 20 and the wall 37 and flanges 40 and 42 be approximately .005 inch; however, clearances slightly larger are operative as are lesser clearances. In fact, even if the lip 20 lightly contacts the ring 36, a satisfactory labyrinth seal will result accompanied by a slight wearing of the lip 20 until the contact terminates. This wear can occur at the lip 20 since there is no lubrication at this location, while little or no wear will occur at the contact between the lip 18 and the shaft 12 since there will be a film of lubricant at this location from the lubricant present within the space 19. The flange 40 extends axially to the right sufficiently so that the right end thereof is closely spaced with respect to the portion 25 of the case 24.

By the positioning of secondary sealing lip 20 in the annular recess 38, a secondary seal of the labyrinth type is created by which dirt, dust and water are precluded from entry to the area of contact between the primary lip 18 and the shaft 12. Additionally, the ring 36 and the backing case 24 protect the elastomeric body 16 from being damaged by rocks, stones, and the like.

While a preferred embodiment of this invention has been shown and described, it is understood that changes can be made therein without departing from the scope of this invention as defined in the following claims.

What is claimed is:

1. An oil seal for sealing the space between a lubricant containing housing member and an axially extending shaft member rotatably mounted in an opening in the housing member, the shaft member having a portion radially spaced from the portion of the housing member surrounding the opening therein, with said members having sealing surfaces on such opposed portions, comprising: (a) an annular elastomeric element disposed in the space between said members and having a radially extending body portion with opposed radial ends and a pair of lips formed integrally with one of said radial ends and extending in opposed axial directions therefrom, (b) means connecting the other of said radial ends of said body portion to one of said members in a sealing and non-rotatable relationship, (c) one lip of said pair of lips engaging the sealing surface of the other of said members in a rotatable sealing relationship, said one lip extending axially inwardly from said body portion with respect to said housing member, (d) the other lip of said pair of lips being radially spaced from said other member and said one lip and extending from said body portion in an axially outwardly direction with respect to said housing, (e) and an annular protecting element having a radially extending wall and radially spaced inner and outer walls formed integrally with said radial wall and extending axially therefrom whereby said walls define an axially open recess therebetween, (f) said protecting element being secured to said other member with its inner and outer walls axially overlying and radially closely spaced to the radially inner and outer peripheries of said other lip respectively and terminating short of said engagement of said one lip and said other of said members and said radially extending wall being closely spaced from the axially outer end of said other lip, whereby said protecting element and said other lip form a labyrinth seal to protect said one lip.

2. An oil seal according to claim 1 including a backing plate for said elastomeric element, said backing plate including a radially extending annular first segment secured to the axially outer radially extending surface of the body portion of said elastomeric element, and an annular second segment formed integrally with said first segment and extending axially therefrom and peripherally of and secured to at least the axially outer portion of said other radial end of said body portion, said second segment being in pressing engagement with said one of said members.

3. An oil seal according to claim 2 wherein said one of said members is said housing, said other of said members is said shaft, and said first segment of said backing plate has an annular opening therethrough through which said shaft and said other lip of said pair of lips extends, and the axially inner end of said outer wall of said protecting element is closely spaced with respect to said first segment of said backing plate.

4. An oil seal according to claim 3 wherein said second segment of said backing plate extends axially inwardly from said first segment for less than the full axial extent of the periphery of said other radial end of said body portion, and the axially inner portion of said periphery sealingly engages the sealing surface of said housing member.

5. An oil seal according to claim 4 wherein the sealing surface of said housing member includes a radially inwardly extending annular shoulder at the axially inner end thereof, the axially inner portion of said elastomeric element adjacent the periphery thereof sealingly engages said shoulder, and said backing plate also includes a radially inwardly extending annular third segment formed on the axially inner end of said second segment and imbedded in said elastomeric element.

References Cited

UNITED STATES PATENTS 3,194,571   7/1965  Peickii et al.         277—184
3,341,265   9/1967  Paterson           277—37 X SAMUEL ROTHBERG, Primary Examiner